Patented Jan. 10, 1933

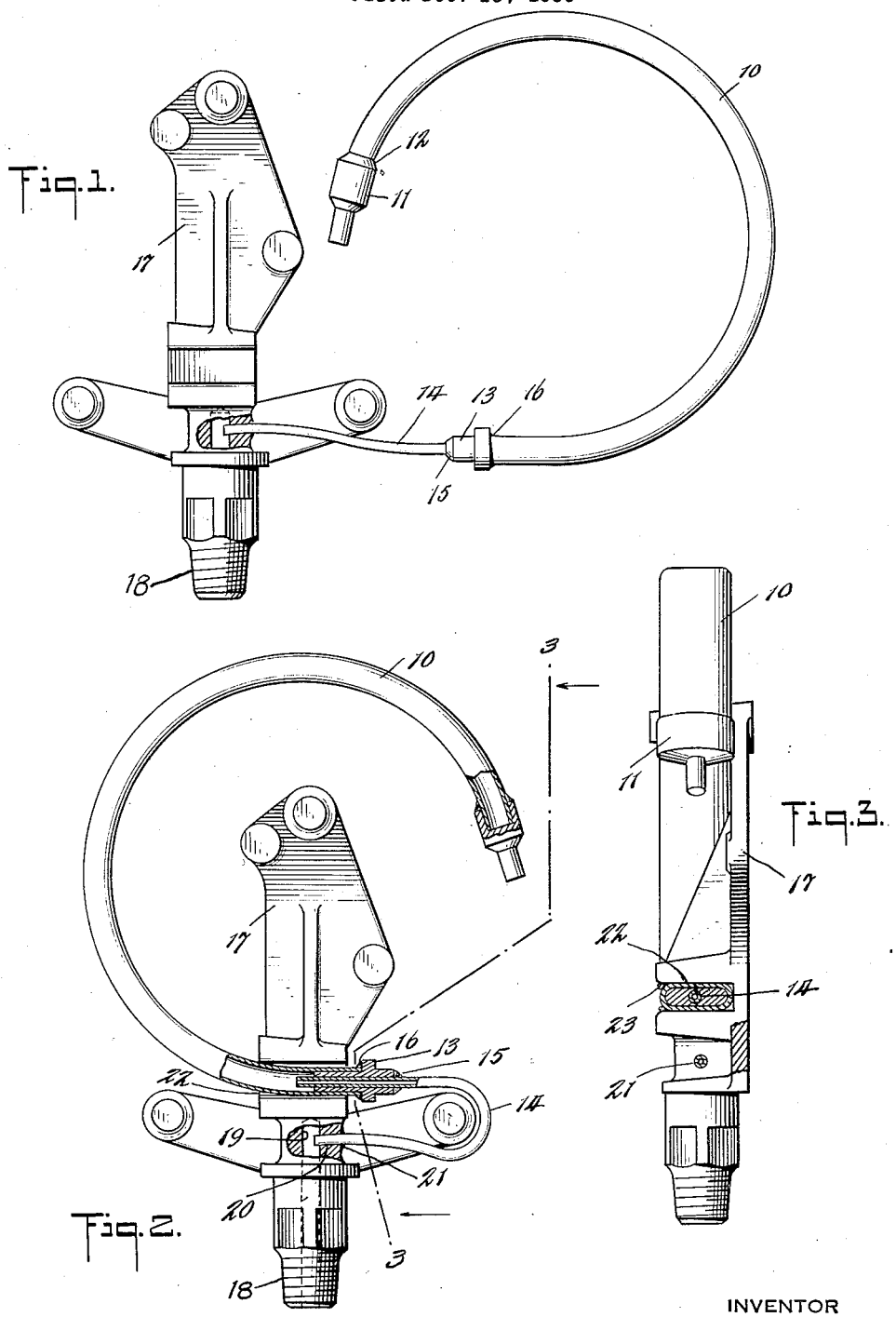

1,894,153

UNITED STATES PATENT OFFICE

ADRIAN P. BRIETZKE, OF TOLEDO, OHIO, ASSIGNOR TO MOTO METER GAUGE & EQUIPMENT CORPORATION, OF TOLEDO, OHIO, A CORPORATION OF DELAWARE

PRESSURE GAUGE

Application filed December 16, 1930. Serial No. 502,779.

My invention relates to improvements in pressure gauges, and particularly to high pressure hydraulic gauges and ammonia gauges.

It is customary to use Bourdon tubing in such devices, and for hydraulic gauges where the pressure is high the Bourdon tubes are produced by cutting a steel rod to length, drilling same on a gun drill, turning on a lathe while reducing in section intermediate the ends until the proper wall thickness is obtained to suit the pressure for which the gauge is intended, and screw threading the ends to accommodate the end piece and socket, and finally forming and flattening the tube in a press. This method of producing such tubes is expensive, and tubes thus produced often receive scratches during the drilling which may eventually cause the tube to fail through cracking. Then too it is difficult to maintain the highly essential uniformity in wall thickness.

To complete these tubes, end pieces are screwed on and the tube is mounted into operating position by screwing into the socket against a lead gasket, the threads in both instances being first tinned.

My invention contemplates the production of a complete Bourdon tube without the drilling, turning and screw threading operations, having a wall structure and surface far superior to that obtained by drilling a rod, and subject to accurate measurements before any appreciable labor is performed on it.

Another object of the invention is to provide a highly efficient and economical connection between the Bourdon tube and the apparatus with which it is operatively associated.

In the accompanying drawing I have shown a Bourdon tube embodying my invention attached to the usual pressure gauge support.

Figure 1 is a side elevation of a pressure gauge support and Bourdon tube in position for connection according to my invention;

Fig. 2 is a similar view with the parts completely assembled and partly in section; and Fig. 3 is a view in section on the line 3—3 of Figure 2.

Referring to the drawing the numeral 10 designates a drawn steel seamless tube of any required alloy, which can be drawn in the oval thus eliminating the costly and objectionable steps necessary to the production of such tubes from rods. These drawn tubes present a natural structure and surface far superior to that of the tubes fabricated from the rod, and enable careful inspection and accurate measurement before any appreciable labor is performed in fabricating the complete Bourdon tube. Tubing is chosen for the particular pressure gauge according to proper wall thickness.

After the tube is cut to proper length it is rolled or bent and an end piece 11 is placed over one end of the tube and preferably welded thereto as at 12, and the plug 13 with the capillary 14 is inserted in the other end of the tube. The plug 13 is welded to capillary 14 at 15 and to tube 10 at 16. This completely assembled tube is then heat-treated which consists usually of hardening and drawing, prior to mounting it on the pressure gauge support 17, which is shown as having the usual screw threaded end 18 for connection with the apparatus on which the gauge is to operate, and a longitudinal passage 19 for communication with such apparatus.

The Bourdon tube as described above is now mounted on the support 17 by inserting the free end of the capillary 14 through the opening 20 and into the passage 19 and then welding the capillary to the support at 21. By using the capillary a welding operation can be performed after the tube has been tempered due to the fact that the heat generated in process of welding can not travel up the capillary to anneal the tube.

After the welding has been completed, which is done with the tube in the position shown in Figure 1, the tube assembly is swung over until the tube is within a lateral recess 22 in the support where it can be anchored by solder at 23.

The advantages of the invention should be apparent from the foregoing, but I may mention that in the case of gauges used on an ammonia compression line where all other joints, as a rule, in the ammonia system are welded it is very desirable to extend the degree of welding as far as possible, and my invention is especially valuable as all joints in the tube system may be autogenously welded to make the union in every instance as strong as the tube itself.

In some systems it should be possible to substitute brazing for welding at some points without departing from the teachings of the invention or the scope of the appended claims.

I claim:

1. In combination with a support, a Bourdon tube produced from drawn tubing, a flexible connection between said support and said Bourdon tube of a length sufficient for permitting welding of joints between said flexible connection and said support without the welding process annealing the tube.

2. In combination with a pressure gauge support having a passage therein, a Bourdon tube, a capillary connected to the tube and communicating with said passage in the support, said capillary being of sufficient length to permit welding of joints between said capillary and said support, without the welding process annealing the tube.

3. In a gauge, a support having a passage therein, a Bourdon tube assembly for gauges comprising a drawn tube, connectors on the ends of the tube, and a capillary attached to one of said connectors said capillary being operatively connected to said support in connection with said passage by welding.

4. A Bourdon tube assembly for gauges comprising a drawn tube, connectors welded on the ends of the tube and a capillary having one end welded to one of said connectors, said assembly being heat treated, in combination with a member having a passage therein, the other end of said capillary being welded to said member and communicating with said passage.

5. A mounting for a Bourdon tube comprising a support having a passage therein and an opening through the wall of the support communicating with the passage means including said opening through which the Bourdon tube communicates with the passage, a recess in the support within which a portion of the tube is disposed, a wall between said recess and said passage, and means for anchoring said tube in the recess.

6. In combination with a support having a recess, a Bourdon tube, a capillary welded to said Bourdon tube and to said support, said capillary being bent to permit said Bourdon tube to enter said recess.

7. In combination with a support having a recess, a Bourdon tube mounted in said recess, said support having a passage and an opening leading into said passage, and a capillary connecting said Bourdon tube with said opening.

8. A device of the character described, comprising in combination, a support having a passage therein and an opening through the wall of the support communicating with said passage, a recess in said support adjacent said passage, a heat treated assembly comprising a Bourdon tube and a capillary, said capillary being connected to said opening by welding and an end portion of said Bourdon tube being disposed in said recess, the capillary being of sufficient length to permit welding to the support without the welding process annealing the Bourdon tube.

In testimony whereof I have signed my name to this specification.

ADRIAN P. BRIETZKE.